(12) United States Patent
Haustein

(10) Patent No.: US 8,908,489 B2
(45) Date of Patent: Dec. 9, 2014

(54) METHOD AND DEVICE FOR DATA PROCESSING AND COMMUNICATION SYSTEM COMPRISING SUCH DEVICE

(75) Inventor: Thomas Haustein, Potsdam (DE)

(73) Assignee: Adtran GmbH, Berlin-Siemensstadt (DE)

( * ) Notice: Subject to any disclaimer, the term of this patent is extended or adjusted under 35 U.S.C. 154(b) by 616 days.

(21) Appl. No.: 12/680,267

(22) PCT Filed: Sep. 26, 2008

(86) PCT No.: PCT/EP2008/062890
§ 371 (c)(1),
(2), (4) Date: Jun. 11, 2010

(87) PCT Pub. No.: WO2009/040408
PCT Pub. Date: Apr. 2, 2009

(65) Prior Publication Data
US 2010/0302929 A1 Dec. 2, 2010

(30) Foreign Application Priority Data
Sep. 26, 2007 (EP) .................................... 07018973

(51) Int. Cl.
*H04J 1/12* (2006.01)
*H04B 3/32* (2006.01)
*H04L 25/03* (2006.01)
*H04B 17/00* (2006.01)

(52) U.S. Cl.
CPC . *H04L 25/03159* (2013.01); *H04L 2025/03414* (2013.01); *H04L 2025/03522* (2013.01); *H04B 3/32* (2013.01)

USPC .......................... 370/201; 375/226; 375/296

(58) Field of Classification Search
USPC ................... 370/201, 310, 332, 333
See application file for complete search history.

(56) References Cited

U.S. PATENT DOCUMENTS

| 5,315,585 | A | * | 5/1994 | Iizuka et al. ................. 370/289 |
| 5,541,964 | A | | 7/1996 | Cohen et al. |
| 5,812,594 | A | * | 9/1998 | Rakib ............................ 375/219 |
| 6,959,015 | B1 | * | 10/2005 | Hwang et al. ................. 370/516 |

(Continued)

FOREIGN PATENT DOCUMENTS

| WO | 9740587 A1 | 10/1997 | |
| WO | WO 2006/129140 | * 12/2006 | ............ H04M 11/06 |

OTHER PUBLICATIONS

Ginis Get Al: "Vectored Transmissionfor 3-11, Digital Subscriber Line Systems" 13-16 IEEE Journal on Selected Areas in Communications, IEEE Service Center, Piscataway, US, vol. 20, No. 5, Jun. 1, 2002, pp. 1085-1104, ISSN: 0733-8716 paragraph [0III]; figures 6,8.*

(Continued)

Primary Examiner — Xavier Szewai Wong
(74) Attorney, Agent, or Firm — Laurence A. Greenberg; Werner H. Stemer; Ralph E. Locher

(57) ABSTRACT

Method and device for data processing and communication system with such a device. The method and the device allow data processing via at least one channel. The method includes the following step of transmitting an idle pattern across the at least one channel when no information is conveyed. The idle pattern is created such that interference and/or crosstalk resulting from the idle pattern can be reduced at the receiving side.

17 Claims, 2 Drawing Sheets

(56) References Cited

U.S. PATENT DOCUMENTS

| | | | |
|---|---|---|---|
| 7,119,505 B2* | 10/2006 | Komaki et al. | 318/113 |
| 7,738,596 B2* | 6/2010 | Lin et al. | 375/316 |
| 2007/0036207 A1* | 2/2007 | Wang | 375/222 |
| 2007/0110135 A1* | 5/2007 | Guess et al. | 375/148 |
| 2011/0286503 A1 | 11/2011 | Cioffi et al. | |

OTHER PUBLICATIONS

Ginis G., Cioffi J. "A multi-user precoding scheme achieving crosstalk cancellation with application to DSL systems", Oct. 29-Nov. 1 2000, pp. 1627-1631, vol. 2.*

ITU-T G993.1: Series G: "Transmission Systems and Media, Digital Systems and Networks", Very High Speed Digital Subscriber Line Transceivers, International Telecommunication Union, Jun. 2004, Geneva, Switzerland.

ITU-T G993.2: Series G: "Transmission Systems and Media, Digital Systems and Networks", Very High Speed Digital Subscriber Line Transceivers 2 (VDSL2), International Telecommunication Union, Feb. 2006, Geneva, Switzerland.

Papandreou, N., et al., "Far-End Crosstalk Identification Method Based on Channel Training Sequences", IEEE Transactions on Instrumentation and Measurement, IEEE USA (Online), vol. 54, No. 6 Dec. 2005, pp. 2204-2212, XP002478905.

* cited by examiner

METHOD AND DEVICE FOR DATA PROCESSING AND COMMUNICATION SYSTEM COMPRISING SUCH DEVICE

BACKGROUND OF THE INVENTION

Field of the Invention

The invention relates to a method and to a device for data processing and to a communication system comprising such a device.

DSL or xDSL, is a family of technologies that provide digital data transmission over the wires of a local telephone network.

Asymmetric Digital Subscriber Line (ADSL) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

VDSL (Very High Speed DSL) is an xDSL technology providing faster data transmission over a single twisted pair of wires. High bit rates are achieved at a range of about 300 meters (1000 ft), which allows for 26 Mbit/s with symmetric access or up to 52 Mbit/s in downstream –12 Mbit/s in upstream with asymmetric access.

Currently, standard VDSL uses up to 4 different frequency bands, two for upstream (from the client to the telecom provider) and two for downstream. The underlying modulation technique is DMT (discrete multitone modulation), wherein each tone carries a specified number of bits that are incorporated into a complex QAM (quadrature amplitude modulation) symbol.

According to its high bandwidth, VDSL is capable of supporting applications like HDTV, as well as telephone services (e.g., Voice over IP) and general Internet access, over a single connection.

VDSL2 (Very High Speed Digital Subscriber Line 2) is an access technology that exploits the existing infrastructure of copper wires that were originally used for plain old telephone service (POTS). It can be deployed from central offices, from fiber-fed cabinets preferably located near the customer premises, or within buildings.

VDSL2 is designed to support the wide deployment of Triple Play services such as voice, video, data, high definition television (HDTV) and interactive gaming. VDSL2 enables operators and carriers to gradually, flexibly, and cost efficiently upgrade existing xDSL infrastructure.

ITU-T G.993.2 (VDSL2) is an enhancement to G.993.1 (VDSL) that permits the transmission of asymmetric and symmetric (full duplex) aggregate data rates up to 200 Mbit/s on twisted pairs using a bandwidth up to 30 MHz.

The xDSL wide band modulation approaches are problematic relating to crosstalk interference that is introduced to the twisted pair transmission line and received by the modem.

Crosstalk occurs when wires are coupled, in particular between wire pairs of the same or a nearby bundle that are used for separate signal transmission. Hence, data signals from one or more sources can be superimposed on and contaminate a data signal. The crosstalk comprises a near-end crosstalk (NEXT) and a far-end crosstalk (FEXT).

Based on such crosstalk, data signals transmitted over twisted-pair lines can be considerably degraded by the crosstalk interference generated on one or more adjacent twisted-pair phone lines in the same and/or a nearby multi-core cable or bundle. With an increasing transmission speed, this problem even deteriorates, which may significantly limit a maximum data rate to be transmitted via a single line.

Furthermore, idle data sent induce crosstalk interference and hence disturb user data sent via other lines of, e.g., a multi-core cable. As there are typically 50 lines within one multi-core cable, such crosstalk could significantly impair the overall performance of the transmitting capability.

Processing of a pre-coding matrix at the central office (CO) results in processing a 50*50 matrix thereby consuming a significant region on a chip and leading to a high power consumption.

In order to support higher order modulation to increase data rate for the individual user and/or the total data rate transmitted from the central office to customer premises equipments (CPEs) inter-line cross-talk is a limiting factor for the achievable signal to interference and noise ratio (SINR) at the CPEs.

The main component of the inter-line crosstalk is determined by the coupling coefficients of the lines involved in the transmission system. The inter-line crosstalk is generally slowly varying over time and can be considered almost constant over a certain time period.

According to [1] achievable rates of a communication channel remain unchanged if the receiver observes the transmitted signal in the presence of additive interference, provided that the transmitter knows the interference non-causally.

It is known that for real time implementation on a dedicated hardware, sub-optimal schemes like Tomlinson-Harashima pre-coding for decentralized receivers (see [2], [4]) or joint transmission (see [3], [5]) can be used alternatively.

However, these concepts bear the disadvantage that an increased number of users results in a high complexity of the whole pre-coding procedure. Furthermore, it is almost a prerequisite that all user data have to be available in one processing unit, which would perform something like matrix vector multiplications on a per sub-carrier basis if DMT (Discrete Multitone Modulation) of OFDM (Orthogonal frequency-division multiplexing) is used as the underlying multi-carrier transmission technique.

DSL cables often contain twisted pair cables, where, e.g., five pairs are intertwined together as sub-cables and another ten of those sub-cables are twisted around each other to build the whole cable used in the field. Hence, relevant cross-talk happens inside each such sub-cable.

Such cable structure may enable an appropriate ordering of channel outputs (users) and channel inputs at the central office within the channel matrix thereby allowing a block structure in the matrix localizing the most relevant interference lines within such blocks of the channel matrix.

Such a structure of the channel matrix is a prerequisite for pre-coding which reduces inter-channel interference to a certain extent. However, if localization and hence clustering of the lines is not possible and hence a channel matrix comprising such a simplified block structure cannot be reached, the task of reducing interference between the lines may still be achieved, but at the expense of high complexity.

In a DSL environment, even if CPEs are not used and hence are not actively transmitting and/or receiving user data, still idle traffic is generated between each CPE connected and the CO or the DSLAM for, e.g., synchronization purposes.

Hence, the idle mode constantly generates interference and/or crosstalk with an impact to active lines conveying user data.

BRIEF SUMMARY OF THE INVENTION

The problem to be solved is to overcome the disadvantages as stated before and to reduce interference and/or crosstalk caused by network elements that are in an idle state as well as to reduce a complexity of pre-coding utilized for active (non-idle) users.

This problem is solved according to the features of the independent claims. Further embodiments result from the depending claims.

In order to overcome this problem, a method for data processing via at least one channel is provided comprising the following steps:
transmitting an idle pattern across said at least one channel when no information is conveyed,
wherein said idle pattern is created such that interference and/or crosstalk resulting from said idle pattern can be reduced at the receiving side.

The at least one channel may connect a central office (CO) and/or a digital subscriber line access multiplexer (DSLAM) with at least one customer premises equipment (CPE). Information to be conveyed preferably relates to user data, e.g., video, voice, signaling, control, i.e. all kind of data that is different from idle data. Idle data, however, may not contain any information useful for or utilized by a subscriber. Idle data preferably relates to synchronization data for maintaining the connection itself.

The idle pattern is created in a way that allows a reduction of an interference and/or crosstalk resulting from said idle pattern. Said idle pattern may hence be chosen such that it can be compensated or reduced to a significant extent on the receiving side. In other words, the known idle pattern can be utilized on the transmitting side in a pre-coding process in order to achieve a benefit for compensation purposes (at the receiver) once the information and/or data is conveyed to the receiver.

Hence, the idle pattern may in particular be known to the receiver(s), in particular to the CPEs. This allows fast synchronization and interference reduction on the receiving side in particular during a setup phase.

A receiver at a CPE may listen to said idle pattern and hence synchronize on this idle pattern in a fast and efficient way. After synchronization, the receiver may request user data and is still able to further adapt its filters utilizing a difference between its user data and interference and/or crosstalk stemming from said idle patterns of at least one line of the cable binder.

In an embodiment, an identical idle pattern is conveyed for each channel.

In particular the identical idle pattern (that may further be chosen in a way to be compensated) can be used for at least two channels, in particular for all channels not transmitting user data (i.e. channels with associated network entities, e.g., CPEs, being in an idle state).

Hence, the idle pattern being the same for several channels allows to significantly reduce a processing effort for reducing an interference and/or crosstalk.

In another embodiment, information to be conveyed over the at least one channel is pre-processed such that interference and/or crosstalk can be reduced at the receiving side.

In a further embodiment, an active pre-coding is performed in particular at a central office for each channel that conveys information towards a customer premises equipment.

The central office (CO) may also be or comprise a digital subscriber access line multiplexer (DSLAM). Users are connected each to the CO by a customer premises equipment (CPE). Data is conveyed to the user (downlink) from the CO to the CPE. The opposite direction is referred to as uplink.

Pre-coding can be performed at the CO, in particular for each channel that has to convey user data to a CPE. Interference and/or crosstalk cancellation may then be processed at the CPE.

In a next embodiment, the at least one channel is at least one communication channel. In particular, the at least one channel may comprise at least one wireless channel. Alternatively or in addition, the at least one channel may comprise a fixed network channel. The at least one channel may also utilize WiMAX.

It is to be noted that the approach presented herewith does not only rely to the field of DSL, but also applies to various kinds of communication concepts via, e.g., fixed or wireless channels. Furthermore, combinations of wireless and fixed concepts may be utilized by the concept of data processing as suggested herewith.

It is also an embodiment that the at least one channel is at least one wireless and/or fixed connection between a central office and/or a digital subscriber line access multiplexer and at least one customer premises equipment at the receiving side.

Pursuant to another embodiment, the method provided is utilized in a communications network, in particular in a telecommunications network.

According to an embodiment, said at least one channel comprises at least one fixed point to multi-point connection.

According to another embodiment the fixed point to multi-point connection comprises at least one stationary or quasi-stationary positioning of a base station of a central office and/or of a user terminal.

The problem state supra is also solved by a device for data processing, in particular for interference and/or crosstalk reduction and/or cancellation comprising a processor unit that is arranged and/or equipped such that the method as described herein is executable on said processor.

It is an embodiment that said device is a communication device, in particular a Central Office (CO) or a Digital Subscriber Line Access Multiplexer (DSLAM).

According to a further embodiment, said device is a Customer Premises Equipment (CPE). In particular at the receiving side, a crosstalk and/or interference reduction (cancellation) may be performed utilizing the pre-coding conducted at the CO or DSLAM.

The problem is also solve by a communication system comprising said device as describe herein.

DESCRIPTION OF THE INVENTION

Figure 1:
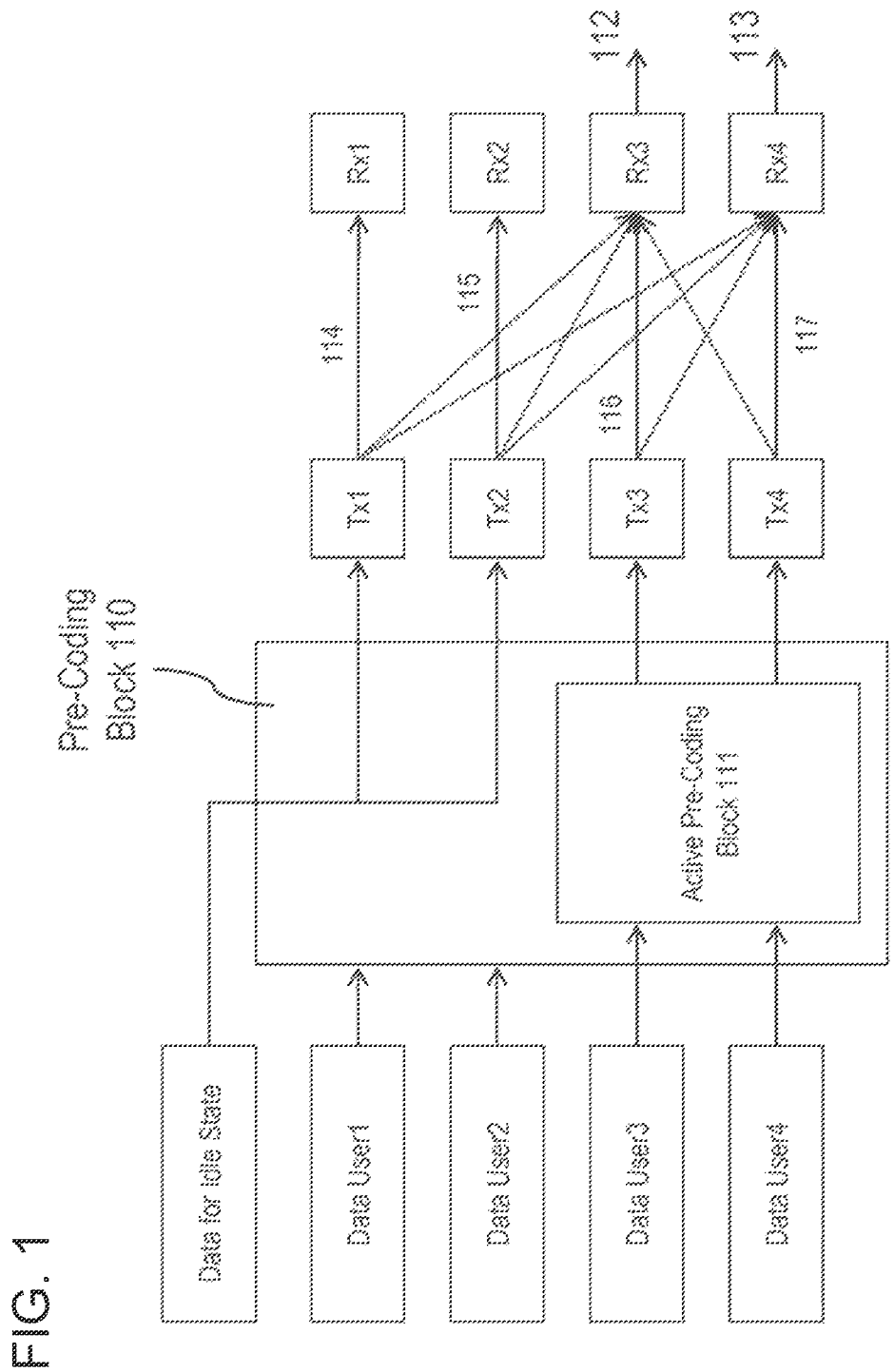
FIG. 1 shows a schematic diagram comprising a transmission system with four transmitters and four receivers and a pre-coding block comprising an active pre-coding block.

FIG. 1 shows a schematic diagram comprising a transmission system with four transmitters and four receivers.

Data of different users, i.e. Data User1 to Data User 4, are input to a Pre-Coding Block 110. Data User1 and Data User2 are in an idle state and convey no user data to the receiving side, whereas Data User3 and Data User4 are active and need to convey information to the receiving side, i.e. via transmitter Tx3 to receiver Rx3 and via transmitter Tx4 to receiver Rx4.

Transmitters Tx1 and Tx2 (associated with Data User1 and Data User2) transmit idle patterns as they do not have to provide any "useful information" to their respective receivers Rx1 and Rx2.

In order to allow an efficient pre-coding as well as significant interference and/or crosstalk reduction, identical idle data are transmitted via said transceivers Tx1 and Tx2.

Due to crosstalk and/or interference, data conveyed via each channel/connection 114 to 117 may have a distinct impact to adjacent channels (shown by the dashed arrows in FIG. 1).

Due to the identical idle patterns conveyed via channel 114 and channel 115, an active pre-coding can be conducted for the channels 116 and 117 within the Pre-Coding Block 110.

An Active Pre-Coding Block 111 allows to at least reduce crosstalk and/or interference arriving on a signal level 112 and 113 at the customer-premises equipments.

Due to the fact that identical idle pattern are conveyed via each channel (here 114 and 115) that does not have to transmit useful information, the idle pattern is known at the transmitter and can be considered within the active pre-coding.

The active pre-coding block 111 may further comprise pre-coding means to reduce a crosstalk/interference impact based on each of the transmitters Tx3 and Tx4 to the respective other channel 116 and 117.

Figure 2:
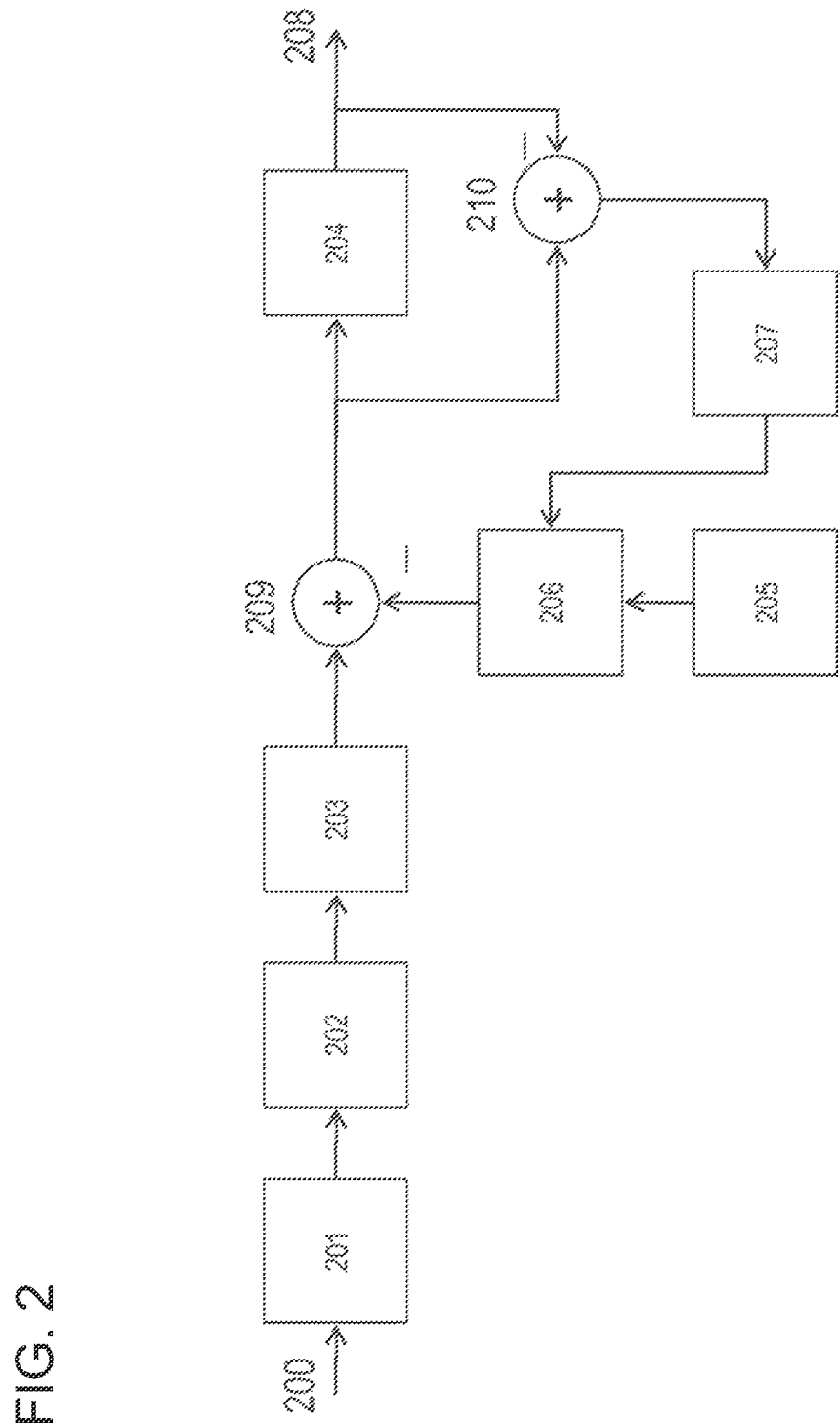
FIG. 2 shows an equalizer structure at a receiver processing an incoming signal and reducing crosstalk and/or interference.

FIG. 2 shows an equalizer structure at a receiver. It visualizes as how signals 112 and 113 according to FIG. 1 could be processed.

A signal 200 corresponds to the incoming signal 112 or 113 according to FIG. 1. Such signal 200 is preferably an input signal arriving at a customer premises equipment.

A block 201 depicts a receiver that may preferably include filters for processing the received signal. In particular, the block 201 comprises the elements required for processing the received signal on a carrier frequency.

Next, in a block 202 a cyclic prefix (CP) is removed and a FFT is conducted.

A subsequent block 203 comprises a frequency domain equalizer. The output of block 203 is fed to an adder 209.

In a block 205 known data from an idle channel (see channels 114, 115 of FIG. 1) is cancelled in a synchronized way from data symbols received.

The output of block 205 is fed to a block 206 which comprises an equalizer of idle data to subtract a sum interference of the joint interference channels of all idle users (idle channels, channels carrying idle pattern). A new filter matrix is determined by multiplying the old filter matrix with a residual filter matrix.

The output of block 206 is fed to the adder 209 and subtracted from the output signal of block 203.

The result of the adder 209 is forwarded to a block 204, i.e. a decision unit comprising a demodulator and a fault error correction (FEC) unit.

The output of block 204 is the output data stream for the user with cancelled (or at least reduced) crosstalk and/or interference.

The output of block 204 is also fed back to an adder 210, i.e. subtracted from the input signal fed to the block 204.

The output signal of the adder 210 is further fed to a block 207 performing an estimation of a residual idle channel and calculating compensation weights for interference and/or crosstalk cancellation based on known idle sequences including an optional interpolation in the frequency domain.

The output of block 207 is input to block 206.

Hence, the approach presented herewith comprises in particular the following steps:

a. All transmitters associated with users that are in an idle state convey the same sequence (idle pattern) to their respective receiver.

Such a coherent transmission combines the interference channels of all idle users into a single transmission.

b. An interference/crosstalk suppression pre-coding is conducted for all active users that need to convey user data to their respective receivers.

c. Interference cancellation is conducted on the known idle sequence individually at each receiver using calculated weights utilizing a precise channel state information on the joint interference channel and appropriate weights.

d. The interference-cancelled data stream of the user is decoded using a suitable hard or soft decision de-mapper, preferably in combination with a forward error correction (FEC) code.

e. A residual interference is determined by subtracting a signal output by the hard or soft decision from a signal prior to such decision.

f. A known idle sequence is utilized to estimate the residual interference channel to update an interference cancellation filter. Further, frequency interpolations techniques may be used in order to reduce an estimation error.

Further advantages of the approach suggested are in particular as follows:

(1) A significant interference and/or crosstalk reduction is achieved after cancellation at the receiving side.

(2) The interference channels of all idle users are combined into one channel and can be treated (processed) as one channel.

(3) This common and known interference based on the pre-defined idle pattern can be cancelled almost perfectly.

(4) The system is very robust.

(5) The system allows to smoothly follow the interference filter even in cases of (dis)connecting active users.

(6) Interference compensation may be completely performed at the terminal at a feasible and preferably fixed complexity.

(7) The system also compensates changes of the interference channel due to clock jitter between the transmitters and the receiving unit.

(8) The approach works dependent on a signal-to-noise ratio (SNR), i.e. the higher the SNR at a particular sub-carrier or sub-carrier block, the more important is an efficient interference suppression and the higher is the achievable gain in a throughput.

(9) Pre-coding on all active links may not be affected by the approach suggested and hence can be used for pre-transmission interference avoidance purposes.

(10) The complexity for the pre-coding is a function of the active users and not a function of all users which are connected and contribute to crosstalk.

REFERENCES

[1] M. Costa, "Writing dirty paper", IEEE Transactions on Information Theory, vol. 29, pp. 439-441, May 1983.

[2] R. F. H. Fischer, C. Windpassinger, A. Lampe, J. B. Huber, Space-Time Transmission using Tomlinson-Harashima Precoding, In $4^{th}$ Intern. ITG Conf. on Source and Channel Coding, pp. 139-147, Berlin, January 2002.

[3] P. W. Baier, M. Meurer, T. Weber, and H. Tröger, Joint Transmission (JT, an alternative rationale for the downlink of Time Division CDMA using multi-element transmit antennas), Proc. IEEE ISSSTA, NJIT, New Jersey, U.S.A., pages 1-5, 6-8 Sep. 2000.

[4] T. Haustein, M. Schubert, and H. Boche, On Power Reduction Strategies for the Multi-User Downlink with Decentralized Receivers, In IEEE VTC-Spring, Korea, April 2003.

[5] T. Haustein, A. Forck, H. Gäbler, C. v. Helmolt, V. Jungnickel, and U. Krueger, Implementation of Adaptive Channel Inversion in a Real-Time MIMO System. In IEEE PIMRC, Barcelona, Spain, September 2004.

The invention claimed is:

1. A method for data processing in a communication network via at least one channel connecting a central office with at least one transmitter and at least one customer premises equipment (CPE) with a receiver, comprising the steps of:
with all the transmitters:
conveying the same idle sequence to each respective receiver of an associated CPE that is in an idle state;
conducting interference and/or crosstalk suppression pre-coding for a CPE when user data needs to be conveyed to a respective receiver;
in each of the receiver:
conducting interference cancellation on the idle sequence using an interference filter;
decoding interference-cancelled data streams using a hard or soft decision de-mapper;
determining residual interference by subtracting signals output by the hard or soft decision de-mapper from a signal prior to such decision; and
utilizing the idle sequence to estimate a residual interference channel to update the interference cancellation filter.

2. The method according to claim 1, wherein the interference-cancelled data stream of the user is decoded in combination with a forward error correction code.

3. The method according to claim 1, wherein frequency interpolation techniques are used to reduce an estimation error.

4. The method according to claim 1, wherein the central office is a digital subscriber line multiplexer.

5. The method according to claim 1, wherein the interference cancellation is conducted using calculated weights utilizing a precise channel state information on the joint interference channel and appropriate weight.

6. The method according to claim 5, wherein frequency interpolation techniques are used to reduce an estimation error.

7. The method according to claim 5, wherein the central office is a digital subscriber line multiplexer.

8. The method according to claim 5, wherein the interference-cancelled data stream of the user is decoded in combination with a forward error correction code.

9. The method according to claim 8, wherein the central office is a digital subscriber line multiplexer.

10. The method according to claim 8, wherein frequency interpolation techniques are used to reduce an estimation error.

11. The method according to claim 10, wherein the central office is a digital subscriber line multiplexer.

12. A system for data processing including a central office with at least one transmitter and at least one customer premises equipment (CPE) with a receiver, the at least one transmitter and the at least one receiver being particularly configured to perform the steps of the method according to claim 1.

13. The system for data processing according to claim 12, wherein the interference cancellation is conducted using calculated weights utilizing a precise channel state information on the joint interference channel and appropriate weight.

14. The system for data processing according to claim 13, wherein the interference-cancelled data stream of the user is decoded in combination with a forward error correction code.

15. The system for data processing according to claim 14, wherein frequency interpolation techniques are used to reduce an estimation error.

16. The system for data processing according to claim 15, wherein the central office is a digital subscriber line multiplexer.

17. A customer premises equipment (CPE) for communicating with at least one central office including a transmitter, the CPE comprising:
a transmitter configured to:
transmit data; and
a receiver configured to:
conduct interference cancellation using an interference filter on an idle sequence transmitted from the central office when the CPE is in an idle state;
decode interference-cancelled data streams, pre-coded at the at least one central office, using a hard or soft decision de-mapper;
determine residual interference by subtracting signals output by the hard or soft decision de-mapper from a signal prior to such decision; and
utilize the idle sequence to estimate a residual interference channel to update the interference cancellation filter.

* * * * *